UNITED STATES PATENT OFFICE.

EMIL COLLETT AND MORITZ ECKARDT, OF CHRISTIANIA, NORWAY.

PROCESS OF MAKING AMMONIA.

1,003,433.

Specification of Letters Patent. Patented Sept. 19, 1911.

No Drawing. Application filed February 18, 1910. Serial No. 544,692.

*To all whom it may concern:*

Be it known that we, EMIL COLLETT, a subject of the King of Norway, and MORITZ ECKARDT, a subject of the Emperor of Germany, both residing at Christiania, Norway, have invented certain new and useful Improvements in the Process of Making Ammonia; and we do hereby declare the following to be a full, clear, and exact description of the invention, such as will enable others skilled in the art to which it appertains to make and use the same.

The present invention relates to the process of making ammonia which renders the use of cyanogen compounds, such as calciumcyanamid, particularly advantageous, and technically practicable as a raw material.

The process consists in heating the cyanogen compounds in question, mixed with nitrates in the presence of water, which may be in the form of vapor. To this end nitrates in a state of solution or in an evaporated solid condition, are mixed with the cyanogen compound. The generation of ammonia will now be easily effected and at a comparatively low temperature. In some cases it has been found useful to carry out the process while using a constant supply of water or aqueous vapor which may or may not be heated above the temperature necessary for the reaction. In this case the ammonia will be carried away together with the aqueous vapor and can then be readily condensed.

Nitrate of calcium, for instance in the form of common commercial nitrate of lime or a solution of the same, has proved particularly useful as a nitrate. In employing this the residue of reaction contains besides nitrate of calcium, products of decomposition from the cyanogen compound, chiefly carbonate of lime.

The reaction can be so performed that some nitrogen remains in the residue. This remainder of nitrogen, which by the usual method is lost, will now be fully utilized, if the residue is worked with nitrate of lime, for example, in the following manner: The residue from the production of ammonia is brought together with diluted nitric acid. The contents of calcium in the residue will in this manner be converted into nitrate of lime. It will be possible to use the latter together with the nitrate of lime already at hand which has been used for the production of ammonia, as a manure, the remainder of the nitrogen retained in the residue being then utilized at the same time. Thus the main advantage of this process substantially consists in the following features: The production of ammonia takes place most readily at ordinary atmospheric pressure and with an excellent yield. While the residue containing the products of decomposition of the cyanogen compound and the material added otherwise becomes more or less valueless, the above mentioned admixture has the effect that the constituents of the residue, the lime and the material added, as well as the remaining contents of nitrogen compounds, are obtained in a form which can readily be utilized. The following is a specific example of carrying out our process: 100 kg. of calcium-cyanamid containing 20 per cent. of nitrogen is mixed with 205 kg. of hydrous nitrate of lime containing 20 per cent. of water and the mixture heated, if desired while mechanically agitating the mass, to between 120 and 250° centigrade and maintained at this temperature for from 3 to 6 hours. The mass is then treated with nitric acid until the reaction of the mass is neutral, whereupon it is evaporated until a sample stiffens on cooling. The product will then contain about 15 to 25 per cent. of water. The mass after having been allowed to cool, is reduced to a powder and is then ready for sale. If desired the solution formed on treating the mass with nitric acid may be filtered from the residuum insoluble in nitric acid, whereupon the filtrate may be evaporated and further treated in the manner above described.

It is probable that reactions take place during the process as follows:

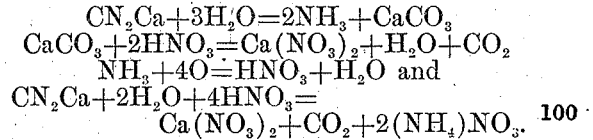

$$CN_2Ca + 3H_2O = 2NH_3 + CaCO_3$$
$$CaCO_3 + 2HNO_3 = Ca(NO_3)_2 + H_2O + CO_2$$
$$NH_3 + 4O = HNO_3 + H_2O \text{ and}$$
$$CN_2Ca + 2H_2O + 4HNO_3 =$$
$$Ca(NO_3)_2 + CO_2 + 2(NH_4)NO_3.$$

We claim:—

1. The process for producing ammonia from cyanid and cyanamid compounds, which consists in heating said materials together with nitrates in the presence of water.

2. The herein described process for producing ammonia from cyanid and cyanamid compounds, which consists in heating said materials together with nitrate of lime in the presence of water.

3. The herein described process for producing ammonia from cyanid and cyanamid compounds, which consists in heating said materials together with nitrates in the presence of water, and reacting on the residual mixture of nitrates and remainder of products of decomposition of the cyanogen compounds with nitric acid to form nitrate of lime.

4. The herein described process for producing ammonia, which consists in heating a cyanogen compound of an alkali-forming metal with an alkali forming metal nitrate and water, maintaining the mixture heated for a period of time, drawing off the ammonia produced and neutralizing the solid product with nitric acid and drying the residue so obtained.

5. The herein-described process for producing ammonia, which consists in heating calcium cyanogen compounds with calcium nitrate and water, maintaining the mixture heated for a period of time, drawing off the ammonia produced and neutralizing the remaining product with nitric acid and drying the residue so obtained.

6. The process for producing ammonia from cyanid and cyanamid compounds, which consists in heating said materials together with nitrates in the presence of water vapor.

7. The herein described process for producing ammonia from cyanid and cyanamid compounds, which consists in heating said materials together with nitrate of lime in the presence of water vapor.

8. The herein described process of producing ammonia, which consists in heating a cyanogen compound of an alkali forming metal with an alkali forming metal nitrate and water vapor heated above the temperature of reaction, maintaining the mixture heated for a period of time, whereby the water vapor will carry off the ammonia formed, neutralizing the residue with nitric acid and drying it.

In testimony that we claim the foregoing as our invention, we have signed our names in presence of two subscribing witnesses.

EMIL COLLETT.
MORITZ ECKARDT.

Witnesses:
HENRY BORDEWICH,
M. GUTHORMSEN.